(12) United States Patent
Brant (10) Patent No.: US 7,432,336 B2
(45) Date of Patent: Oct. 7, 2008

(54) CATALYSTS FOR PROPYLENE COPOLYMERS

(75) Inventor: Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 190 days.

(21) Appl. No.: 10/803,365

(22) Filed: Mar. 18, 2004

(65) Prior Publication Data

US 2004/0210013 A1 Oct. 21, 2004

(51) Int. Cl.
*C08F 4/76* (2006.01)
*C08F 4/52* (2006.01)
*C08F 210/06* (2006.01)

(52) U.S. Cl. .................. 526/170; 526/160; 526/348; 526/943; 526/941; 502/103; 502/117; 556/53; 528/396

(58) Field of Classification Search ................. 526/160, 526/170, 943, 166, 348; 556/53; 528/396
See application file for complete search history.

(56) References Cited

U.S. PATENT DOCUMENTS

| | | | | |
|---|---|---|---|---|
| 5,017,714 A | | 5/1991 | Welborn, Jr. ............... 556/12 |
| 5,304,614 A | * | 4/1994 | Winter et al. ............... 526/127 |
| 5,336,746 A | * | 8/1994 | Tsutsui et al. ............. 526/348.6 |
| 5,504,172 A | * | 4/1996 | Imuta et al. ............... 526/351 |
| 5,679,811 A | * | 10/1997 | Winter et al. ............. 556/7 |
| 5,741,563 A | | 4/1998 | Mehta et al. ............... 428/35.1 |
| 5,763,080 A | | 6/1998 | Stahl et al. ............... 428/378 |
| 5,795,946 A | | 8/1998 | Agarwal et al. .......... 526/348.1 |
| 5,830,968 A | * | 11/1998 | Sadatoshi et al. ........ 526/348.1 |
| 5,846,896 A | | 12/1998 | Ewen ........................ 502/117 |
| 5,986,008 A | | 11/1999 | Matsunaga et al. .......... 525/240 |
| 6,143,846 A | * | 11/2000 | Herrmann et al. ........... 526/170 |
| 6,143,911 A | * | 11/2000 | Fujita et al. ............... 556/11 |
| 6,156,856 A | | 12/2000 | Saito et al. ............... 526/90 |
| 6,331,590 B1 | | 12/2001 | Herrmann et al. ............. 525/55 |
| 6,350,830 B1 | * | 2/2002 | Gores et al. ................. 526/159 |
| 6,399,533 B2 | * | 6/2002 | Sacchetti et al. ............ 502/125 |
| 6,476,172 B1 | | 11/2002 | Wachowicz et al. ...... 526/348.1 |
| 6,794,476 B2 | * | 9/2004 | Machida et al. ............. 526/351 |
| 2001/0007896 A1 | | 7/2001 | Agarwal et al. ............. 526/335 |
| 2002/0013440 A1 | | 1/2002 | Agarwal et al. ............. 526/335 |
| 2004/0106738 A1 | * | 6/2004 | Machida et al. ............. 525/240 |

FOREIGN PATENT DOCUMENTS

| | | | |
|---|---|---|---|
| DE | 38 25 814 A1 | * | 2/1990 |
| EP | 0 284 708 B1 | | 10/1988 |
| EP | 0 374 695 A3 | | 6/1990 |
| EP | 0 318 049 B1 | | 4/1992 |
| EP | 0 575 875 | | 12/1993 |
| EP | 0 643 078 | | 3/1995 |
| EP | 0 682 042 | | 11/1995 |
| EP | 0 890 584 | | 1/1999 |
| EP | 1 052 263 A2 | * | 11/2000 |
| EP | 1 209 165 | | 5/2002 |
| WO | WO 97/19991 | | 6/1997 |
| WO | WO 00/01766 | | 1/2000 |
| WO | WO 02/083753 | | 10/2002 |
| WO | 02/090399 | | 11/2002 |

OTHER PUBLICATIONS

Galimberti et al. Macromolecules 1999, 32, 7968-7976.*
Galimberti et al., "Metallocenes for Ethene/Propene Copolymerizations with High Product of Reactivity Ratios", Macromolecules 1999, 32, 7968-7976, XP-002286818.
Resconi et al., "Diastereoselective Synthesis, Molecular Structure, and Solution Dynamics of *meso*- and *rac*-{Ethylenebis(4,7-dimethyl-$\eta^5$-l-indenyl} zirconium Dichloride Isomers and Chain Transfer Reactions in Propene Polymerication with the *rac* Isomer", Organometallics 1996, 15, 5046-5059.
Kaminsky, W., et al., "Crystal Structure and Propene Polymerization Characteristics of Bridged Zirconocene Catalysts," *Journal of Organometallic Chemistry*, v. 497 (1995) pp. 181-193.

* cited by examiner

*Primary Examiner*—Vasu Jagannathan
*Assistant Examiner*—Rip A. Lee (57) ABSTRACT

The present invention relates to propylene based copolymers and to processes for producing propylene based copolymers, particularly propylene-ethylene copolymers. These unique copolymers are prepared using metallocene catalysts.

41 Claims, 2 Drawing Sheets

Figure 1:
GPC-3D - g' and IV versus Molecular Weight of Inventive and Comparative Propylene Polymers

CATALYSTS FOR PROPYLENE COPOLYMERS

BACKGROUND

1. Field

The present invention relates to propylene polymers and to processes for producing propylene polymers, particularly propylene-ethylene copolymers. These copolymers are prepared using metallocene catalysts.

2. Description

Propylene homopolymers and copolymers ("propylene polymers") are used in a wide variety of applications including fibers, films, adhesives and molded articles. These polymers may be amorphous, elastic or have varying degrees of crystallinity. They may be used alone or blended with various other olefin polymers to obtain particular properties. Examples include block copolymers, random copolymers, impact copolymers and thermoplastic polyolefins.

Various processes have been proposed for making propylene polymers. These processes typically employ different variables and parameters, including different monomer compositions, solvents, additives, reaction conditions, catalyst systems, etc. The properties and characteristics of the final product have a great deal to do with selected process variables and parameters, particularly with respect to the particular catalyst used.

The use of metallocene catalysts to make propylene polymers is well known. Metallocene catalyzed products offer certain advantages over Ziegler-Natta catalyzed products, primarily as a result of more uniform composition and molecular weight distributions. It is well known that bridged or stereorigid, chiral metallocenes are required for making high tacticity propylene polymers.

The use of metallocenes for preparing high tacticity propylene polymers has been very well studied. Investigations into these metallocenes first focused on the specific type of bridge between the two cyclopentadienyl or indenyl groups. It was found that silicon-based bridges, as opposed to carbon-based bridges, provided much higher molecular weight and melting point. See, e.g., EP 284 708 B1, U.S. Pat. Nos. 5,846, 896, and 5,017,714. Once this phenomenon was well established, investigations focused on varying particular indenyl substitutions as a means of further increasing molecular weight and melting point. After this discovery, there was apparently little or no further investigations into propylene polymers prepared with carbon or alkylene radical bridged metallocenes.

Another early learning was that copolymers produced with metallocene catalyst had a far more efficient and uniform comonomer incorporation compared to copolymers prepared with traditional Ziegler-Natta catalysts, which yield copolymers having a disproportionate amount of comonomer concentrated in the lower molecular weight portion of the product. See, e.g., EP 318 049 B1 and EP 374 695.

It is also now well established that molecular weight, crystallinity, and melting point decrease substantially as comonomer content increases. This phenomenon has been exploited, for example, to improve the processability of nonwoven fabric made from propylene copolymers. See, e.g., U.S. Pat. Nos. 5,304,614, 5,763,080, 5,795,946, 5,741,563, 6,156,856, 6,476,172, WO 97/19991, WO 00/01766, and WO 02/083753. See also, U.S. Pat. No. 5,504,172.

A very well known method of broadening composition distribution to enhance processing characteristics, is to use two different metallocene compounds during polymerization, and/or to use multiple reactors with varying polymerization conditions in each.

Another approach to improving the processability and/or strength of propylene polymers is to induce branching. This can be accomplished using diene monomer as described in U.S. Application Nos. 20010007896 and 20020013440, or by varying the type of metallocene used.

This invention provides a method for preparing unique propylene polymers using a single species of metallocene catalyst that, in a single reactor, can surprisingly produce propylene copolymers having a broad composition distribution, specifically increasing comonomer content with increasing molecular weight.

SUMMARY

This invention includes a process for preparing a propylene copolymer and propylene copolymer prepared therefrom, the process comprising: polymerizing propylene and comonomer selected from $C_2$ and $C_4$-$C_{10}$ in the presence of the product of activator and metallocene compound represented by the formula:

wherein: M is a metal of Group 4, 5, or 6 of the Periodic Table,
$R^1$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{40}$ arylalkyl group, preferably a $C_7$-$C_{10}$ arylalkyl group, a $C_7$-$C_{40}$ alkylaryl group, a $C_8$-$C_{40}$ arylalkenyl group, a halogen atom, or a conjugated diene which is optionally substituted with one or more hydrocarbyl, tri(hydrocarbyl)silyl groups or hydrocarbyl, tri(hydrocarbyl)silylhydrocarbyl groups, said diene having up to 30 atoms not counting hydrogen;
$R^2$ are identical or different, are one of a hydrogen atom, a halogen atom, a $C_1$-$C_{10}$ alkyl group which may be halogenated, a $C_6$-$C_{10}$ aryl group, which may be halogenated, a $C_2$-$C_{10}$ alkenyl group, a $C_7$-$C_{40}$ arylalkyl group, preferably a $C_7$-$C_{10}$ arylalkyl group, a $C_7$-$C_{40}$ alkylaryl group, a $C_8$-$C_{40}$ arylalkenyl group, a —$NR_2^{17}$, —$SR^{17}$, —$OR^{17}$, —$OSiR_3^{17}$ or —$PR_2^{17}$ radical, wherein: $R^{17}$ is one of a halogen atom, a $C_1$-$C_{10}$ alkyl group, or a $C_6$-$C_{10}$ aryl group;

$R^3$ are as defined for $R^1$;

$R^8$ is hydrogen or:

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{1}5$, together with the atoms binding them, form a cyclic ring;

$M^2$ is carbon;

$R^9$ and $R^{10}$ are identical or different and have the meanings stated for $R^1$;

$R^4$, $R^5$, $R^6$ and $R^7$ are identical or different and have the meanings stated for $R^1$ provided that at least one of $R^4$ and $R^7$ are not hydrogen; and m and n are identical or different and are zero, 1 or 2.

In any embodiment described herein: M may be selected from zirconium and hafnium; $R^2$ and/or $R^3$ may be hydrogen; $R^{14}$, $R^{15}$ and $R^{16}$ may be hydrogen or a $C_1$-$C_4$ alkyl group; $R^8$ may be hydrogen; and m and n may equal 1.

Also described herein is a process for preparing a propylene copolymer composition comprising: polymerizing propylene and comonomer selected from $C_2$ and $C_4$-CIO in the presence of a the product of activator and metallocene compound represented by the formula:

wherein: M is a metal of Group 4, 5, or 6 of the Periodic Table, $R^1$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{40}$ arylalkyl group, preferably a $C_7$-$C_{10}$ arylalkyl group, a $C_7$-$C_{40}$ alkylaryl group, a $C_8$-$C_{40}$ arylalkenyl group, a halogen atom, or a conjugated diene which is optionally substituted with one or more hydrocarbyl, tri(hydrocarbyl)silyl groups or hydrocarbyl, tri(hydrocarbyl)silylhydrocarbyl groups, said diene having up to 30 atoms not counting hydrogen;

$R^2$ are identical or different, are one of a halogen atom, a $C_1$-$C_{10}$ alkyl group which may be halogenated, a $C_6$-$C_{10}$ aryl group, which may be halogenated, a $C_2$-$C_{10}$ alkenyl group, a $C_7$-$C_{40}$ arylalkyl group, preferably a $C_7$-$C_{10}$ arylalkyl group, a $C_7$-$C_{40}$ alkylaryl group, a $C_8$-$C_{40}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, a $C_1$-$C_{10}$ alkyl group, or a $C_6$-$C_{10}$ aryl group;

$R^3$ are as defined for $R^1$;

$R^8$ is:

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

$M^2$ is carbon;

$R^9$ and $R^{10}$ are identical or different and have the meanings stated for $R^1$;

$R^4$, $R^5$, $R^6$ and $R^7$ are identical or different and have the meanings stated for $R^1$ provided that at least one of $R^4$ and $R^7$ are not hydrogen; and m and n are identical or different and are zero, 1 or 2.

In any embodiment described herein: $R^5$, $R^6$, $R^9$ and/or $R^{10}$ may be hydrogen; and $R^4$ and $R^7$ may be identical and selected from one of fluorine, chlorine or bromine atom, a $C_1$-$C_4$ alkyl group, or a $C_6$-$C_{10}$ aryl group.

In any embodiment described herein, the comonomer may be ethylene.

In any embodiment described herein, the polymer may contain at least 75 weight percent propylene derived units based on the total weight of the polymer.

In any embodiment described herein, the metallocene compound is preferably a single species.

In any embodiment described herein, process is preferably a single step polymerization process conducted in a single reactor.

Also described herein is propylene polymer comprising: a) at least 50 wt % units derived from propylene; b) a ratio of two g's as determined by the formula:

$$\frac{g'_{88-98}}{g'_{20-60}} \geq 1.10$$

where the subscripts, 88-98 and 20-60, refer to the wt % of polymer eluted in GPC-DRI, and in the numerator and the denominator, g' is the weight average g' over the elution range designated (88-98 and 20-60).

In any embodiment described herein, the propylene polymer may have a ratio of two g's that is equal to or greater than 1.30.

In any embodiment described herein, the propylene polymer may have from 2 wt % to. 28 wt % comonomer, preferably ethylene, derived units, or from 6 wt % to 28 wt % comonomer, preferably ethylene derived units.

Also described is a propylene copolymer composition comprising: a) at least 50 wt % units derived from propylene, and from 2 wt % to 28 wt % units derived from ethylene; b) a ratio of two g's as determined by the formula:

$$\frac{g'_{88-98}}{g'_{20-60}} \geq 1.10$$

where the subscripts, 88-98 and 20-60, refer to the wt % of polymer eluted in GPC-DRI, and in the numerator and the denominator, g' is the weight average g' over the elution range designated (88-98 and 20-60).

In particular, the present invention related to the use of metallocenes of the formula ("Formula I"):

wherein: M is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ are identical or different, preferably identical, and are one of a hydrogen atom, a $C_1$-$C_{10}$ alkyl group, preferably a $C_1$-$C_4$ alkyl group, a $C_1$-$C_{10}$ alkoxy group, preferably a $C_1$-$C_3$ alkoxy group, a $C_6$-$C_{10}$ aryl group, preferably a $C_6$-$C_8$ aryl group, a $C_6$-$C_{10}$ aryloxy group, preferably a $C_6$-$C_8$ aryloxy group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, a halogen atom, preferably chlorine; or a conjugated diene which is optionally substituted with one or more hydrocarbyl, tri(hydrocarbyl)silyl groups or hydrocarbyl, tri(hydrocarbyl)silylhydrocarbyl groups, said diene having up to 30 atoms not counting hydrogen;

$R^2$ are identical or different, preferably identical, and are one of a hydrogen atom, a halogen atom, preferably a fluorine, chlorine or bromine atom, a $C_1$-$C_{10}$ alkyl group, preferably a $C_1$-$C_4$ alkyl group, which may be halogenated, a $C_6$-$C_{10}$ aryl group, which may be halogenated, preferably a $C_6$-$C_8$ aryl group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, an —$NR_2^{17}$, —$SR^{17}$, —$OR^{17}$, —$OSiR_3^{17}$ or —$PR_2^{17}$ radical, wherein: $R^{17}$ is one of a halogen atom, preferably a chlorine atom, a $C_1$-$C_{10}$ alkyl group, preferably a $C_1$-$C_3$ alkyl group, or a $C_6$-$C_{10}$ aryl group, preferably a $C_6$-$C_9$ aryl group; in one preferred embodiment, $R^2$ is not a hydrogen atom;

$R^3$ may be as defined for $R^1$ but are preferably hydrogen atoms or are methyl or isopropyl groups;

$R^8$ is hydrogen or:

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring, preferably R8 is hydrogen;

preferably, $R^{14}$, $R^{15}$ and $R^{16}$ are identical and are a hydrogen atom, a halogen atom, a $C_1$-$C_4$ alkyl group, a $CF_3$ group, a $C_6$-$C_8$ aryl group, a $C_6$-$C_{10}$ fluoroaryl group, more preferably a pentafluorophenyl group, a $C_1$-$C_4$ alkoxy group, in particular a methoxy group, a $C_2$-$C_4$ alkenyl group, a $C_7$-$C_{10}$ arylalkyl group, a $C_8$-$C_{12}$ arylalkenyl group, or a $C_7$-$C_{14}$ alkylaryl group;

$M^2$ is carbon;

$R^9$ and $R^{10}$ are identical or different, preferably identical, and have the meanings stated for $R^1$;

$R^4$, $R^5$, $R^6$ and $R^7$ are identical or different and have the meanings stated for $R^1$;

preferably, $R^5$ and $R^6$ are hydrogen and at least one of $R^4$ and $R^7$, preferably both, are identical or different, preferably identical, are not hydrogen, and are one of a halogen atom, preferably a fluorine, chlorine or bromine atom, a $C_1$-$C_{10}$ alkyl group, preferably a $C_1$-$C_4$ alkyl group, which may be halogenated, a $C_6$-$C_{10}$ aryl group, which may be halogenated, preferably a $C_6$-$C_8$ aryl group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, an —$NR_2^{15}$, —$SR^{15}$, —$OR^{15}$, —$OSiR_3^{15}$ or —$PR_2^{15}$ radical, wherein: $R^{15}$ is as defined above; and m and n are identical or different and are zero, 1 or 2, preferably 1.

DETAILED DESCRIPTION

Various specific embodiments, versions and examples of the invention will now be described, including preferred embodiments and definitions that are adopted herein for purposes of understanding the claimed invention. It is understood, however, that for purposes of assessing infringement, the scope of the "invention" will refer to the appended claims, including their equivalents, and elements or limitations that are equivalent to those that are recited.

Definitions and Properties

As used herein, the term "solvent" is defined broadly, to refer to any liquid medium in which any of the polymerization reactions described herein can take place, but not including any liquid material that is polymerizable, such as monomers. The term "solvent" includes diluents, which are preferably inert, and specifically includes the solvents and diluents disclosed in Weng et al., U.S. Pat. No. 6,225,432.

The definition of the term "reactor" or "reactor system" used herein is any vessel, structure, enclosure, or combinations thereof in which a polymerization reaction is capable of taking place, and also includes any vessel or combination of vessels in which the various polymerization processes described herein take place, in whole or in part. A reactor system can thus be or include a single reactor vessel, or multiple reactor vessels, e.g., series or parallel reactors unless otherwise specified.

Copolymers are polymers having units derived from two or more monomer types which may be arranged randomly, in blocks or in multiple phases such as occurs in impact copolymers. When referring to a specific type of copolymer, the first named olefin makes up a majority of the copolymer. For example, a "propylene-ethylene" copolymer will have more than 50 weight percent propylene derived units based on the total weight of the copolymer.

Metallocenes are of the same "type" or "species" when they are not "different." One metallocene is considered to be "different" from another metallocene when the two metallocenes have different chemical structures, except that metallocene compounds that are enantiomers of each other are not considered to be different from each other.

To calculate g' for propylene polymers that include at least some monomer units, the following equations should be used: g'=1.18w, where "w" is the weight fraction of the monomer, for example, ethylene.

g' is an average index, $<g'>_{avg}$, defined as:

$$<g'>_{avg} = \frac{[\eta]_{sample}}{[\eta]_{linear\ standard}} = \frac{\sum_{i=1}^{N} C_i \times [\eta]_i}{\sum_{i=1}^{N} C_i \times [k \times M_i^\alpha]}$$

Here, the index i refers to a given polymer fraction, $M_i$ is the molecular weight of that fraction as measured by light scattering, $[\eta]_i$ is the intrinsic viscosity of that fraction measured by viscometry, $C_i$ is the concentration of that fraction, and "k" and "α" are the Mark Houwink coefficients for a linear polymer of the same chemical species. These quantities are measured by a GPC setup with online light scattering, viscometer, and concentration detectors.

In practice, average deviation levels can be calculated from GPC-3D method involving three different detectors on line—LALLS, Viscometry, DRI—to measure, respectively, the molecular weights, viscosity, and concentration of the polymer solution. First, the GPC-LALLS data is used to measure molecular weight averages ($M_w$, $M_z$). The respective intrinsic viscosity of the polymer solution, "η", is obtained from the viscometer data while the concentration at each data point is provided by the DRI technique. Finally the "η" is related to absolute molecular weight. Weight-average values of g' are to be calculated from the data points that fall in the range of from the characteristic $M_w$ of the polymer examined to the upper limit of 2,000,000 Daltons. For any case in which some values of $M_w$ are below 100,000 Daltons, the weight average is calculated using only those points between 100,000 Daltons and 2,000,000 Daltons. See, "Effect of Short Chain Branching on the Coil Dimensions of Polyolefins in Dilute Solutions," by T. Sun, P. Brant, R. Chance and W. Graessley, Macromolecules 2001, Vol. 34 (No. 19), pages 6812-6820, which is incorporated herein by reference.

Melting and crystallization temperatures of the polymers (Tm and Tc) are measured on a DuPont DSC-912 with thin molded film samples, scanning at 10° C./min.

As used herein, the term "polypropylene" or "propylene polymer" means a polymer containing at least 50 wt % propylene derived units, preferably at least 70% propylene units. A polypropylene having 100% propylene units may be referred to as a "homopolymer."

As used herein, the term "polymerization medium" includes at least the monomers that form the propylene polymer and optionally a solvent. The term "polymerization medium" does not include a catalyst system, e.g., catalyst compounds or activators. After polymerization has begun, the polymerization medium may also include products of polymerization, e.g. macromers and polymers.

As used herein, the term "slurry polymerization" means a polymerization process in which particulate, solid polymer is formed in a liquid or vapor polymerization medium.

As used herein, the term "bulk process" means a polymerization process in which the polymerization medium consists entirely of or consists essentially of monomers and any products of polymerization that has taken place, e.g. macromers and polymers, but does not include solvent.

As used herein the term "single step" or "single stage" polymerization process means that once polymerization begins, polymerization conditions are not manipulated in any way that would produce multiple species of polymer product.

As used herein, the terms "unimodal" and "unimodal molecular weight distribution" are defined as any molecular weight distribution of a polymer composition that is neither bimodal nor multimodal, and broadly encompasses any polymer composition of which a GPC-3D curve can be taken, and the derivative of such GPC-3D curve demonstrates no inflection point. Preferably, a GPC-3D curve is prepared using the viscometer and light scattering test procedures, conditions and equipment set forth in the article, "Effect of Short Chain Branching on the Coil Dimensions of Polyolefins in Dilute Solutions," by T. Sun, P. Brant, R. Chance and W. Graessley, Macromolecules 2001, Vol. 34 (No. 19), pages 6812-6820, which is incorporated herein by reference.

The amount of vinyl chain ends is determined by $^1$H NMR as set forth in the literature, specifically in Weng et al., Macromol. Rapid Commun. 2000, 21, 1103-07.

The terms "molecular weight" ($M_n$ and $M_w$) and "polydispersity" ($M_w/M_n$) are intended to broadly encompass molecular weights that are obtained, measured and/or calculated using any art-recognized procedure, except when a particular procedure is specified herein. Preferably, the molecular weights are measured in accordance with the procedure described in the article by T. Sun et al., cited above.

The term "isotactic" as used herein is defined as referring to a polymer sequence in which more than 50% of adjacent monomers having groups of atoms that are not part of the backbone structure are located either all above or all below the atoms in the backbone chain, when the latter are all in one plane.

The term "syndiotactic" as used herein is defined as referring to a polymer sequence in which more than 50% of adjacent monomers which have groups of atoms that are not part of the backbone structure are located in some symmetrical fashion above and below the atoms in the backbone chain, when the latter are all in one plane.

A property that can be used to characterize the propylene polymers described herein is heat of fusion. As used herein, the "heat of fusion" is measured using Differential Scanning Calorimetry (DSC). About 4 mg to about 10 mg of the dried polymer is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak of the sample which is typically at a maximum peak at about 30° C. to about 175° C. and occurs between the temperatures of about 0° C. and about 200° C. The thermal output is measured in joules as a measure of the heat of fusion. The melting point is recorded as the temperature of the greatest heat absorption within the range of melting temperature of the sample.

The term "melting point" for a material as used herein is defined as the highest peak among principal and secondary melting peaks as determined by Differential Scanning Calorimetry (DSC), discussed above.

As used herein, the term "productivity" is defined as the weight of polymer produced per weight of the catalyst used in the polymerization process per 1 hour of polymerization time (e.g., grams polymer/gram catalyst/hr).

Certain specific embodiments of the invention will now be discussed. In one or more specific embodiments, metallocene compounds are provided which may be represented by Formula I as described above. Formula 1 represents an alkyl bridged bis-indenyl metallocene that is optionally but preferably substituted at the 2 position, either or both of the 4 and 7 positions, and optionally at other positions on the indenyl ring. Preferably the metallocene is only substituted at the 2, 4 and 7 positions. The substituents may be different at the same position on each indenyl. Such metallocenes are asymmetrically substituted. Preferably, though, the metallocenes of this invention are symmetrically substituted in that each indenyl has the same substituents at the same positions.

Substitution at the 2 position is well known to increase the molecular weight of polypropylene. Particularly preferred substituents at the 2 position ($R^2$) are methyl, ethyl, propyl, isopropyl, and butyl (primary, secondary and tertiary). Particularly preferred substituents at the 4 position ($R^4$) and 7 position ($R^7$) are methyl, ethyl, propyl, isopropyl, butyl (primary, secondary and tertiary), phenyl (which may be substituted), and 3,5-dialkyl(phenyl) where the alkyl substituent is selected from methyl, ethyl, propyl and butyl (primary, secondary or tertiary).

In a most preferred embodiment, the metallocene is symmetrically substituted at the 4 and 7 positions with the same substituent.

Specific examples of metallocenes represented by the Formula I are:
rac-1,2-ethylenebis(4,7-dimethyl-indenyl)hafnium dichloride;
rac-1,2-ethylenebis(4,7-diethyl-indenyl)hafnium dichloride;
rac-1,2-ethylenebis(4,7-diisopropyl-indenyl)hafnium dichloride;
rac-1,2-ethylenebis(4,7-di-t-butyl-indenyl)hafnium dichloride;
rac-1,2-ethylenebis(4-methyl-7-phenyl-indenyl)hafnium dichloride;
rac-1,2-ethylenebis(4-phenyl-7-methyl-indenyl)hafnium dichloride; and zirconium analogs of these as well as zirconium and hafnium dialkyl, for example, dimethyl (as opposed to the dichloride) analogs.

Also: rac-1,2-ethylenebis(2,4,7-trimethyl-indenyl)hafnium dichloride;
rac-1,2-ethylenebis(2-ethyl-4,7-dimethyl-indenyl)hafnium dichloride;
rac-1,2-ethylenebis(2-isopropyl-4,7-dimethyl-indenyl) hafnium dichloride;
rac-1,2-ethylenebis(2-n-butyl-4,7-dimethyl-indenyl) hafnium dichloride;
rac-1,2-ethylenebis(2-iso-butyl-4,7-dimethyl-indenyl) hafnium dichloride;
rac-1,2-ethylenebis(2-tert-butyl-4,7-dimethyl-indenyl) hafnium dichloride;
rac-1,2-ethylenebis(2-sec-butyl-4,7-dimethyl-indenyl) hafnium dichloride;
rac-1,2-ethylenebis(2-methyl-4,7-diethyl-indenyl)hafnium dichloride;
rac-1,2-ethylenebis(2,4,7-triethyl-indenyl)hafnium dichloride;
rac-1,2-ethylenebis(2-isopropyl-4,7-diethyl-indenyl) hafnium dichloride;
rac-1,2-ethylenebis(2-n-butyl-4,7-diethyl-indenyl)hafnium dichloride;
rac-1,2-ethylenebis(2-iso-butyl-4,7-diethyl-indenyl) hafnium dichloride;
rac-1,2-ethylenebis(2-tert-butyl-4,7-diethyl-indenyl) hafnium dichloride;
rac-1,2-ethylenebis(2-sec-butyl-4,7-diethyl-indenyl) hafnium dichloride;
rac-1,2-ethylenebis(2-methyl-4,7-diisopropyl-indenyl) hafnium dichloride;
rac-1,2-ethylenebis(2-ethyl-4,7-diisopropyl-indenyl) hafnium dichloride;
rac-1,2-ethylenebis(2,4,7-triisopropyl-indenyl)hafnium dichloride;
rac-1,2-ethylenebis(2-n-butyl-4,7-diisopropyl-indenyl) hafnium dichloride;
rac-1,2-ethylenebis(2-iso-butyl-4,7-diisopropyl-indenyl) hafnium dichloride;
rac-1,2-ethylenebis(2-tert-butyl-4,7-diisopropyl-indenyl) hafnium dichloride;
rac-1,2-ethylenebis(2-sec-butyl-4,7-diisopropyl-indenyl) hafnium dichloride;
rac-1,2-ethylenebis(2-methyl-4,7-di-t-butyl-indenyl) hafnium dichloride;
rac-1,2-ethylenebis(2-ethyl-4,7-di-t-butyl-indenyl)hafnium dichloride;
rac-1,2-ethylenebis(2-isopropyl-4,7-di-t-butyl-indenyl) hafnium dichloride;

rac-1,2-ethylenebis(2-n-butyl-4,7-di-t-butyl-indenyl) hafnium dichloride;
rac-1,2-ethylenebis(2-iso-butyl-4,7-di-t-butyl-indenyl) hafnium dichloride;
rac-1,2-ethylenebis(2,4,7-tri-t-butyl-indenyl)hafnium dichloride;
rac-1,2-ethylenebis(2-sec-butyl-4,7-di-t-butyl-indenyl) hafnium dichloride;
rac-1,2-ethylenebis(2,7-dimethyl-4-phenyl-indenyl) hafnium dichloride;
rac-1,2-ethylenebis(2-isopropyl-4-phenyl-7-methyl-indenyl)hafnium dichloride;

and zirconium analogs of these as well as zirconium and hafnium dialkyl, for example, dimethyl (as opposed to the dichloride) analogs.

These metallocenes may be prepared according to general techniques known from the literature, for example, as described by Kaminsky et al, *Journal of Organometallic Chemistry,* 497 (1995) 181-193.

In one or more specific embodiments, a process is provided for preparing propylene based polymer compositions. In particular, a process is provided for using the metallocenes described above to prepare unique propylene copolymers.

In one embodiment, a process for producing propylene polymer is provided, which process includes: combining, preferably in a single step or reactor, the product of activator and a metallocene catalyst compound, preferably a single species of metallocene catalyst compound, represented by the Formula I with a polymerization medium that includes propylene monomer and comonomer, for a time sufficient to provide propylene polymer.

In any embodiment described herein, the heat of fusion of the propylene polymer is preferably 80 J/g or less, but in other embodiments can be lower, e.g., 50 J/g or more, or 60 J/g or more, or 70 J/g or more. In some embodiments, the heat of fusion of the propylene polymer is 80 J/g or more; or 90 J/g or more; or 100 J/g or more.

The propylene polymer in any embodiment may contain up to 25 wt %, up to 20 wt %, or up to 15 wt %, up to 10.0 wt %, from 0.2 wt % to 8.0 wt %, or from 0.2 wt % to 5.0 wt % comonomer, preferably ethylene in each case.

Also described herein is a process for preparing a propylene polymer, which process includes: contacting a polymerization mixture that includes propylene monomers and at least one comonomer with an active metallocene catalyst compound represented by the Formula I, preferably a single species of metallocene of the Formula 1; and conducting polymerization of the propylene monomers and comonomers, preferably in a single reactor or step, for a time sufficient to form a propylene polymer composition having a propylene content of 50 wt % or more, preferably 60 wt % or more, or 70 wt % or more, or 80 wt % or more, or 90 wt % or more, most preferably, 70 wt % or more.

In some embodiments, the propylene polymer produced is a thermoplastic polymer composed of a majority of propylene-derived units (by weight) with a minor amount of ethylene or other $C_4$-$C_{10}$ comonomer-derived units. These polymers will have a Tc but have limited crystallinity due to adjacent isotactic propylene units.

These thermoplastic polymers include from a lower limit of 2% or 5% or 6% or 8% or 10% by weight to an upper limit of 20% or 25% or 28% by weight comonomer-derived units, preferably ethylene-derived units. These embodiments will also include propylene-derived units present in the range of from a lower limit of 72% or 75% or 80% by weight to an upper limit of 98% or 95% or 94% or 92% or 90% by weight. These percentages by weight are based on the total weight of the propylene and comonomer-derived units, preferably ethylene-derived units; i.e., based on the sum of weight percent propylene-derived units and weight percent comonomer-derived units being 100%.

These thermoplastic polymer compositions include low crystallinity polymers having a heat of fusion, as determined by DSC, ranging from a lower limit of 1.0 J/g, or 3.0 J/g, or 5.0 J/g, or 10.0 J/g, or 15.0 J/g, or 20.0 J/g, to an upper limit of 125 J/g, or 100 J/g, or 75 J/g, or 57 J/g, or 50 J/g, or 47 J/g, or 37 J/g, or 30 J/g.

The preferred low crystallinity thermoplastic polymers have a single melting point. Typically a sample of the propylene copolymer will show secondary melting peaks adjacent to the principal peak, which are considered together as a single melting point. The highest of these peaks is considered the melting point. The low crystallinity polymer preferably has a melting point by DSC ranging from an upper limit of 125° C., 110° C., or 105° C., or 90° C., or 80° C., or 70° C.; to a lower limit of 50° C., or 55° C., or 60° C., or 65° C., or 70° C., or 75° C., or 80° C. or 85° C.

In some embodiments, the low crystallinity thermoplastic polymer has a weight average molecular weight (Mw) of from 10,000-5,000,000 g/mol, or from 20,000 to 1,000,000 g/mol, or from 80,000 to 500,000 g/mol and a molecular weight distribution Mw/Mn (MWD), sometimes referred to as a "polydispersity index" (PDI), ranging from a lower limit of 1.5 or 1.8 to an upper limit of 10 or 5 or 3. The Mw and MWD, as used herein, can be determined by a variety of methods, including those in U.S. Pat. No. 4,540,753 to Cozewith, et al., and references cited therein, or those methods found in Verstrate et al., Macromolecules, v. 21, p. 3360 (1988), the descriptions of which are incorporated by reference. In some embodiments, this low crystallinity polymer has a Mooney viscosity ML (1+4)@125° C. of 100 or less, preferably 75 or less, more preferably 60 or less, and more preferably 30 or less. Mooney viscosity, as used herein, can be measured as ML/1+4 at 125° C. according to ASTM D1646, unless otherwise specified.

The tacticity index, expressed herein as "m/r", is determined by $^{13}C$ nuclear magnetic resonance (NMR). The tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic homopolymer material theoretically may have a ratio approaching infinity, and many by-product atactic polymers have sufficient isotactic content to result in ratios of greater than 50. The low crystallinity elastomers can have a tacticity index m/r ranging from a lower limit of 4 or 6 to an upper limit of 8 or 10 or 12.

An ancillary procedure for the description of the tacticity of propylene units is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers as the ratio of the number of units of the specified tacticity to all of the propylene triads in the copolymer.

The triad tacticity (mm fraction) of a propylene copolymer can be determined from a $^{13}C$ NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

In some embodiments, the low crystallinity thermoplastic polymers have a triad tacticity of three propylene units, as measured by $^{13}$C NMR, of greater than 75%, or greater than 80%, or greater than 82%, or greater than 85%, or greater than 90%.

In one embodiment, the low crystallinity thermoplastic polymer further includes a non-conjugated diene monomer to aid in the vulcanization and other chemical modification of the polymer blend composition. The amount of diene is preferably less than 10 weight %, and more preferably less than 5 weight %. The diene may be any non-conjugated diene which is commonly used for the vulcanization of ethylene propylene rubbers including, but not limited to, ethylidene norbornene, vinyl norbornene, or dicyclopentadiene.

In other embodiments of the present invention, these low crystallinity thermoplastic polymers are substantially free of diene-derived units.

The low crystallinity polymer may be produced by any process that provides the desired polymer properties, in heterogeneous polymerization on a support, such as slurry or gas phase polymerization, or in homogeneous conditions in bulk polymerization in a medium comprising largely monomer or in solution with a solvent as diluent for the monomers. For industrial uses, continuous polymerization processes are preferred. For these polymers, preferably the polymerization process is a single stage, steady state, polymerization conducted in a well-mixed continuous feed polymerization reactor. The polymerization can be conducted in solution, although other polymerization procedures such as gas phase or slurry polymerization.

The low crystallinity polymers may be made by the continuous solution polymerization process described in WO02/34795, advantageously in a single reactor and separated by liquid phase separation from the alkane solvent.

In any of the processes described above, the metallocene may be used in an unsupported state (i.e., the polymerization is homogeneous).

In any of the processes described above the polymerization conditions may be supercritical.

In any of the processes described above, the propylene polymer is preferably isotactic or syndiotactic, more preferably isotactic.

In any of the processes described above, the active metallocene catalyst compound is preferably combined with propylene in the absence of hydrogen or in the presence of hydrogen in an amount of up to 1.0 mole % hydrogen in the reactor.

In any of the processes described above, the metallocene compound used in the process is the product of combining the metallocene, activator(s) and support material. In a most preferred embodiment, only one species of metallocene is used in a given polymerization process.

In any of the processes described above, the productivity of the activated catalyst compound is preferably 10,000 or more grams polymer per gram catalyst/hr; or 15,000 or more grams polymer per gram catalyst/hr; or 20,000 or more grams polymer per gram catalyst/hr.

In any of the processes described above, the propylene polymer is preferably formed in a polymerization medium comprising 30% or more propylene monomers by volume prior to initiation of polymerization.

In one or more specific embodiments, the polymerization medium preferably includes 70% or more propylene monomers by volume prior to the beginning of polymerization.

In any of the processes described herein, the polymerization medium preferably consists essentially of propylene and comonomers, preferably ethylene. The polymerization medium alternatively consists essentially of monomers and a substantially inert solvent or diluent.

In any of the processes described herein, the polymerization can be carried out in a single reactor and/or step.

In any of the processes described herein, a majority of the product produced may have vinyl chain ends as determined by $^1$H NMR as set forth in Weng et al., Macromol. Rapid Commun. 2000, 21 1103-07.

At least certain embodiments include a process for preparing a propylene polymer utilizing an active metallocene catalyst of the Formula 1, which includes combining the active catalyst system with a polymerization medium (that includes monomers) in a reactor system to form polypropylene macromers that include propylene monomer units, wherein at least 10%, preferably at least 30%, of the polypropylene macromers have vinyl chain ends; and combining the same metallocene compound with the polymerization medium (either simultaneously or sequentially, preferably simultaneously) in the reactor system to form propylene polymers that include propylene monomer units of the polypropylene macromers. Preferably, the formed propylene polymers also include other monomer units, e.g., propylene units that are not part of the polypropylene macromers. Of course, as discussed below, the metallocene compound can be supported or unsupported, and can be introduced once or multiple times, e.g., in a single reactor.

Other embodiments include a process for preparing propylene polymers from propylene monomers, comonomer(s) and a single active metallocene species. That process includes contacting a first portion of the propylene monomers with the metallocene compound for a time sufficient to form macromers having units derived from at least some of the first portion of monomers, at least 30% of the thus formed macromers having vinyl chain ends (although preferably at least 50% and more preferably at least 70% of those macromers have vinyl chain ends); contacting (either later in the process or at the same time, preferably at the same time) the macromers and a second portion of monomers with the same type of metallocene compound for a time sufficient to reduce the number of vinyl chain ends in the macromers having units derived from the first portion of monomers; and forming a propylene polymer having a main chain that includes units derived from the second portion of monomers and branches formed from the macromers having units derived from the first portion of monomers. The aforementioned process has a number of advantages, in at least certain embodiments, including but not limited to the flexibility of using a single supply of supported catalyst particles that each include the desired type of metallocene compound; the ability to easily control the desired degree of branching in the product, e.g., by the composition of the catalyst system itself; the ability to easily obtain product uniformity by minimizing the number of ingredients; and the ability to obtain a propylene polymer having a unimodal molecular weight distribution with high yield and desirable properties, particularly high melt strength.

In one or more embodiments of the process described herein, the resulting propylene polymer has high melt strength. The propylene polymer preferably has a melt flow rate (MFR) within a particular range. That range may have a lower limit of 0.1 dg/min, 0.5 dg/min, or 1.0 dg/min; and the range may have an upper limit of 5000 dg/min, 4000 dg/min, 3000 dg/min, 2000 dg/min, 1000 dg/min, 500 dg/min, or 350 dg/min, with the melt flow rate ranging from any lower limit to any upper limit.

It has been discovered, surprisingly, that a process in which propylene monomers are contacted with the metallocene catalyst system described herein during polymerization provides a propylene polymer with unique properties compared to those produced in a different process, e.g., a process in which mixed (i.e., different) metallocenes are used or a process in which propylene monomers, and often, branch producing comonomers such as diene or hexene, are contacted with a one or more metallocene catalysts in multiple steps or reactors. Moreover, it has been discovered that the particular type of metallocene catalyst described herein leads to unexpectedly superior properties not achievable using certain other metallocenes, for example increased molecular weight despite the presence of comonomer.

In a preferred embodiment, polymerization of propylene monomers, and one or more comonomers to form propylene polymer occurs in a slurry polymerization process, which can also be a bulk process, e.g., no solvent present.

One illustrative non-limiting example of the polymerization conditions includes utilizing a reactor temperature of 100° C. or less, preferably 75° C. or less, at a pressure from 200 kPa to 15,000 kPa, preferably from 600 kPa to 4,000 kPa. In at least one embodiment, over 2,000 grams of propylene polymer is formed per gram of supported metallocene catalyst system. In another embodiment, 6,000 grams of propylene polymer is formed per gram of unsupported metallocene catalyst system.

The propylene polymers of this invention will have a ratio of two g's as described below, where the ratio equals or exceeds 1.10 (a dimensionless number).

$$\frac{g'_{88-98}}{g'_{20-60}} \geq 1.10$$

In the above equation, the subscripts refer to the wt % of polymer eluted in GPC-DRI. In the numerator and the denominator, g' is the average g' over the elution range designated. We define lower % eluted with lower molecular weight and higher percent eluted with higher molecular weight. The minimum number of data points required for the calculation of the numerator or the denominator is 20.

At any given elution, g' is defined as the ratio of intrinsic viscosity of the polymer sample relative to isotactic polypropylene homopolymer. The measurement of g' is made as previously described.

In any embodiment described herein, the g' ratio as determined by application of the above formula is equal to or greater than 1.10, 1.20, 1.30, 1.35, 1.40, 1.45 or 1.50.

Embodiments of the propylene polymers of this invention have increased melt strength in comparison to other propylene polymers. Thus, the propylene polymer and/or its blends are well suited for thermoforming, foaming, blow molding, and other applications which require a high melt strength. However, the propylene polymers and/or its blends can be used in various applications, such as thermoforming, foaming, blow molding, extrusion coating, melt blowing, fiber spinning, viscosity modifiers for lube oils, wax crystal modifiers for hydrocarbon fuels, plasticizers, functionalization of polypropylenes, processing aids, thermoplastic elastomers, impact modifiers, compatibilizers, surface modifiers, wettable polypropylenes, high density polypropylenes, elastic polypropylenes, adhesives, hot melt adhesives, elastic fibers and films, and skin layers on films. The propylene polymers and blends with other polymers and/or materials may be used in any fabricated article, such as films, fibers, sheets, plaques, hoes, belts, tires, tapes, wovens, and other dimensional objects. The propylene polymer and/or blends with other polymers and/or materials may also be used in radiation resistance articles, for example medical gowns and other medical garments and applications.

The chiral metallocenes described above and represented by Formula 1 may be used as a racemate for the preparation of isotactic propylene polymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

It is contemplated that the metallocene compound polymerizes monomers in a primarily beta-methyl elimination mechanism to form propylene macromers with a high amount of vinyl chain ends. It is believed that the same metallocene also polymerizes monomers in a beta-hydride elimination mechanism to form polymer with a low amount of vinyl chain ends.

Activators

The terms "cocatalyst" and "activator" are used herein interchangeably and are defined to be any compound or component which can activate a bulky ligand transition metal compound, e.g., any of the metallocenes defined above. Alumoxane may be used as an activator. A variety of methods can be used for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

Also useful in the described processes are ionizing activators, neutral or ionic, or compounds such as dimethylanilinium tetrakis(perfluorophenyl) boron (DICOP) and tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated for use in the process, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-30 92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this disclosure are those which are compatible, stabilize the metallocene cation in the sense of balancing its ionic charge in a +1 state, yet retain sufficient liability to permit displacement by an ethylenically or acetylenically unsaturated monomer during polymerization.

The use of ionizing ionic compounds not containing an active proton but capable of producing both the active metallocene cation and a noncoordinating anion is also known. See, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl) boron. See, EP-A-0 520 732 (incorporated herein by reference). Ionic catalysts for addition polymerization can also be prepared by oxidation of the metal centers of transition metal compounds by anion precursors containing metallic oxidizing groups along with the anion groups. See, EP-A-0 495 375 (incorporated herein by reference).

Where the metal ligands include halogen moieties (for example, bis-indenyl zirconium dichloride which are not capable of ionizing abstraction under standard conditions, they can be converted via known alkylation reactions with organometallic compounds such as lithium or aluminum hydrides or alkyls, alkylalumoxanes, Grignard reagents, etc. See, EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Catalyst Supports

The metallocenes referenced herein may be supported using a porous particulate material, such as for example, talc, inorganic oxides, inorganic chlorides and resinous materials such as polyolefin or polymeric compounds. Preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 μm. More preferably, the surface area is in the range of from about 50 to about 500 $m^2/g$, the pore volume is in the range of from about 0.5 to about 3.5 cc/g and the average particle size is in the range of from about 20 to about 200 μm. Most preferably the surface area is in the range of from about 100 to about 400 m Ig, the pore volume is in the range of from about 0.8 to about 3.0 cc/g and the average particle size is in the range of from about 30 to about 100 μm. The average pore size of typical porous support materials is $\geq 10$ Å. Preferably, a support material is used that has an average pore diameter of $\geq 50$ Å and most preferably it is in the range of from about 75 to about 350 Å. It may be particularly desirable to dehydrate the silica at a temperature of from about 100° C. to about 800° C. anywhere from about 3 to about 24 hours.

Fumed silicas and low surface area silicas may also be used.

The metallocene, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocene may be preactivated separately and then combined with the support material. If the metallocenes and activator are separately supported, then preferably, they are dried then combined as a powder before use in polymerization.

The total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, Experimental Methods in Catalyst Research, Academic Press, 1968, pages 67-96.

Methods of supporting ionic catalysts including metallocene cations and noncoordinating anions are described in WO 91/09882, WO 94/03506, WO 96/04319 and U.S. Pat. No. 5,643,847 (incorporated herein by reference). The methods generally include either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. The supported catalyst is typically added to the polymerization medium as a suspension in mineral oil. For details regarding prepolymerization, see U.S. Pat. Nos. 4,923,833 and 4,921,825, EP 0 279 863 and EP 0 354 893 each of which is fully incorporated herein by reference.

For preparation of the propylene polymers of this invention, preactivation of the metallocene may be advantageous. For example, it is widely known in the art that preactivation of metallocene before addition to a continuous reactor yields higher activities than continuous addition of metallocene and activator in two separate streams. Furthermore, it may be advantageous to control precontacting time to maximize catalyst effectiveness, e.g., avoiding excessive aging of the activated catalyst composition.

EXAMPLES

Polymerizations

Examples 1-12 and Comparative Examples (C1-C6)

Rac-ethylenebis(4,7-dimethylindenyl)hafnium dimethyl was purchased from Boulder Scientific Company (BSC 609-1-0001: MW=525). Rac-dimethylsilylbis(indenyl)hafnium dimethyl was purchased from Albemarle Corporation. Continuous polymerizations were carried out in a 0.5-liter stainless steel continuous autoclave reactor. This reactor is equipped with a stirrer, steam heating/water cooling element and a pressure controller. Solvent, ethylene and propylene were first chilled to −15° C. prior to entering a manifold, and then pumped into the reactor. In a dry box, the metallocene was pre-activated with MAO or tritylperfluorotetraphenylborate. This catalyst solution was fed into the reactor from the dry box through metering pumps in a separate line. Hexanes were pumped into the reactor at a desired rate to control the residence time.

The reactor was first fed with solvent, and heated to the desired temperature and controlled at a set pressure. The monomers and catalyst were then pumped into the reactor. Catalyst feed rate was constant at $2.23 \times 10^{-7}$ mol/min for all runs. The speed of the stirrer was high enough so the reactor was operated under continuous stirred tank reactor conditions. Polymer samples were collected for 20 minutes each in a collection box when the system reached steady state. Products were dried in a vacuum oven. Reactions were carried out at a pressure of 350 psig and in the temperature range of 70 to 90° C. A summary of the polymerizations is provided in Tables 1a and 1b. ethylene. The two sets of data do not appear to be meaningfully different. Heat of melting is also depressed with increasing ethylene content, and again there is not much difference between this set and the data for the lower conversion polymers.

TABLE 2

| Example | wt % Ethylene | DSC Tg (° C.) | Tm/ΔHm (a) |
|---|---|---|---|
| 1 | 6.76 | | 122.3/53.2 |
| 2 | 11.7 | | 115.8/37.1 |
| 3 | 15.8 | −24.1 | 100.9/42.9 |
| 4 | 13.5 | −18.9 | 107.1/37.8 |
| 5 | 12.8 | −24.5 | 95.0/30.7 |
| 6 | 20.5 | −17.5 (DMTA)−26.7 | 85.4/42.7 |
| 7 | 19.3 | −21 (DMTA)−25.5 | 75/14.5 (b) |
| 8 | | −35.9 | 49.4/12.9 (b) |
| 10 | 5.5 | | 110.7/50.6 |
| 11 | 19.9 | | 95.9/26.1 |
| 12 | 4.2 | −28 | 124.5/32.6 |
| C1 | 5.4 | −16.4 | 102.2/39.0 |
| C2 | 10.6 | −24.2 | 50.5/27.0 |
| C3 | | −33.2 | 52.9/7.5 |
| C4 | 9.6 | −23.7 | 52.1/27.2 |
| C5 | 12.3 | −24.0 | ~60/11 |
| C6 | 12.3 | −24.6 | 49.5/17.2 |

(a) $T_m$ and $\Delta H_m$ are from first melt except where noted.
(b) second melt B. GPC-3D; Molecular weight moments and composition distribution Along with g', the molecular weight moments are summarized in Table 3. Often g' is described as a "branching index", but for this work it is better to think of it as a "comonomer index."

TABLE 3

Summary of GPC-3D Results

| | Molecular Weight Moments (k) | | | | g' g'$_{88-98}$: |
|---|---|---|---|---|---|
| Example | $M_N$ | $M_W$ | Mz | Mz/Mw | g'$_{20-60}$ |
| 1 | 32.1 | 71.5 | 145.4 | 2.03 | 0.99 |
| | | | | | 0.99 |
| 2 | 26.1 | 65.3 | 112.9 | 1.73 | 0.965 |
| | | | | | 1.16 |
| 3 | 32.7 | 87.2 | 199.0 | 2.28 | 1.30 |
| | | | | | 1.66 |
| 4 | 16.2 | 35.1 | 66.9 | 1.91 | 1.03 |
| 5 | 7.3 | 18.2 | 37.5 | 2.06 | 1.10 |
| 6 | 16.3 | 40.2 | 94.8 | 2.34 | 1.13 |
| | | | | | 1.44 |
| 7 | 15.0 | 40.6 | 94.9 | 2.34 | 1.27 |
| | | | | | 1.59 |
| 8 | 3.89 | 9.56 | 16.40 | — | 1.07 |

TABLE 3-continued

Summary of GPC-3D Results

| | Molecular Weight Moments (k) | | | | g' g'$_{88-98}$: |
|---|---|---|---|---|---|
| Example | $M_N$ | $M_W$ | Mz | Mz/Mw | g'$_{20-60}$ |
| 9 | 2.29 | 8.09 | 15.11 | — | 0.94 |
| 10 | 14.4 | 32.0 | 52.5 | 1.64 | 1.00 |
| 11 | 48.7 | 104.8 | 183.1 | 1.75 | 1.01 |
| | | | | | 0.98 |
| 12 | 24.7 | 90.2 | 230.0 | 2.55 | 1.30 |
| C1 | 57.4 | 116.1 | 167.9 | 1.45 | 1.086 |
| C2 | 52.1 | 101.5 | 151.4 | 1.49 | 1.137 |
| | | | | | 0.97 |
| C3 | 47.6 | 89.3 | 131.8 | 1.48 | 1.22 |
| | | | | | 0.97 |
| C4 | 50.5 | 97.1 | 147.3 | 1.52 | 1.15 |
| C5 | 32.8 | 64.7 | 101.8 | 1.57 | 1.128 |
| C6 | 22.2 | 31.3 | 74.0 | 2.36 | 1.10 |

Figure 1:
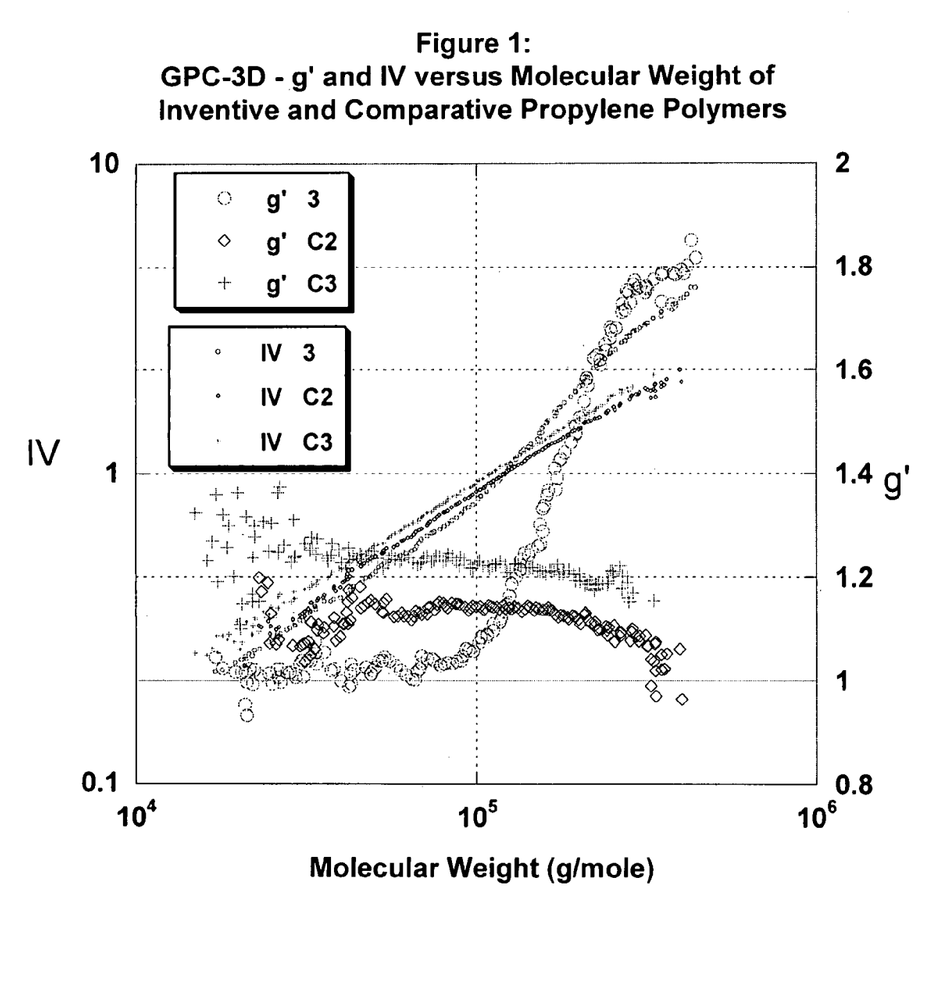
FIG. 1 depicts a comparison of molecular weight and g' for inventive versus comparative propylene polymers.
Figure 2:
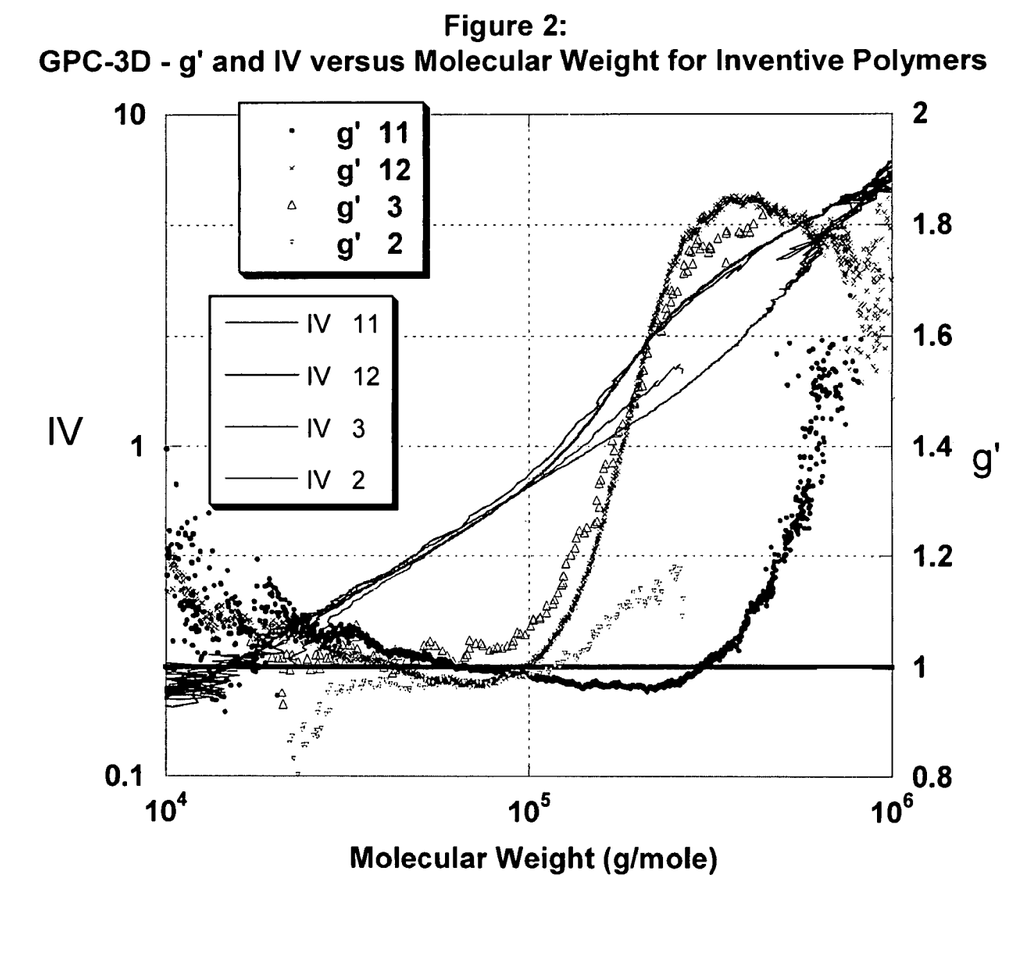
FIG. 2 depicts molecular weight and g' for inventive propylene polymers.

While we list average g' measured for these copolymers in Table 3, it does not begin to capture the unusual shape of the plot g' vs. log MW. Such plots are shown in the Figures. We can see that g' is ~1 at the lower molecular weight end of the distribution. For polymers with both medium and high monomer conversion, g' increases—in several cases very steeply—with increasing molecular weight.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A process for preparing a propylene copolymer, said process comprising:

polymerizing propylene and ethylene in the presence of the product of an activator and a metallocene compound represented by the formula:

wherein: M is hafnium $R^1$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{40}$ arylalkyl group, a $C_7$-$C_{40}$ alkylaryl group, a $C_8$-$C_{40}$ arylalkenyl group, a halogen atom, or a conjugated diene, said conjugated diene substituted with one or more hydrocarbyl, tri(hydrocarbyl)silyl or tri(hydrocarbyl)silylhydrocarbyl groups, and said diene having up to 30 atoms not counting hydrogen;

$R^2$ is a hydrogen atom;

$R^3$ is a hydrogen atom;

$R^8$ is wherein: $R^{14}$, $R^{15}$ and $R^{16}$ are identical or different, and are a hydrogen, a halogen, a $C_1$-$C_{20}$ branched or linear alkyl group, a $C_1$-$C_{20}$ fluoroalkyl, a silylalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

$M^2$ is carbon;

$R^9$ and $R^{10}$ are identical or different, and have the meanings stated for $R^1$;

$R^4$, $R^5$, $R^6$ and $R^7$ are identical or different, and have the meanings stated for $R^1$ provided that at least one of $R^4$ and $R^7$ is not hydrogen; and m and n are identical or different, and are zero, 1 or 2;

wherein the propylene copolymer comprises:

a) at least 50 wt % units derived from propylene;

b) from 10 wt % to 20 wt % ethylene derived units, based on the total weight of the copolymer; and c) a ratio of g' as determined by the formula:

$$(g'_{88-98})/(g'_{20-60}) \geq 1.20$$

where the subscripts, 88-98 and 20-60, refer to the wt % of copolymer eluted in GPC-DRI, and in the numerator and the denominator, g' is the weight average g' over the elution range designated 88-98 and 20-60, respectively, and d) a weight average molecular weight of 20,000 to 1,000,000 g/mol.

2. The process of claim 1 wherein $R^{14}$, $R^{15}$ and $R^{16}$, when present, are hydrogen or a $C_1$-$C_4$ alkyl group.

3. The process of claim 1 wherein m is 1 and n is 1.

4. The process of claim 1 wherein the polymer contains at least 75 weight percent propylene derived units, based on the total weight of the copolymer.

5. The process of claim 1 wherein the metallocene compound is a single species.

6. The copolymer of claim 1 wherein the process is a single step polymerization process conducted in a single reactor.

7. The process of claim 1 wherein the ratio of g' is equal to or greater than 1.30.

8. The process of claim 1, wherein the metallocene compound is selected from the group consisting of:
   rac-1,2-ethylenebis(4,7-dimethyl-indenyl)hafnium dichloride;
   rac-1,2-ethylenebis(4,7-diethyl-indenyl)hafnium dichloride;
   rac-1,2-ethylenebis(4,7-diisopropyl-indenyl)hafnium dichloride;
   rac-1,2-ethylenebis(4,7-di-t-butyl-indenyl)hafnium dichloride;
   rac-1,2-ethylenebis(4-methyl-7-phenyl-indenyl)hafnium dichloride;
   rac-1,2-ethylenebis(4-phenyl-7-methyl-indenyl)hafnium dichloride; and
   dialkyl analogues thereof.

9. A process for preparing a propylene copolymer composition comprising:
   polymerizing propylene and a comonomer of ethylene in the presence of the product of activator and metallocene compound represented by the formula:

wherein: M is a metal of Group 4, 5, or 6 of the Periodic Table, $R^1$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{10}$arylalkyl group, a $C_7$-$C_{40}$ alkylaryl group, a $C_8$-$C_{40}$ arylalkenyl group, a halogen atom, or a conjugated diene, said conjugated diene substituted with one or more hydrocarbyl, tri(hydrocarbyl)silyl or tri(hydrocarbyl)silylhydrocarbyl groups, and said diene having up to 30 atoms not counting hydrogen;

$R^2$ are identical or different, and are a hydrogen atom, a halogen atom, a $C_1$-$C_{10}$ alkyl group, a halogenated $C_1$-$C_{10}$ alkyl group, a $C_6$-$C_{10}$ aryl group, a halogenated $C_6$-$C_{10}$ aryl group, a $C_2$-$C_{10}$ alkenyl group, a $C_7$-$C_{10}$ arylalkyl group, a $C_8$-$C_{40}$ arylalkenyl group, a —$NR_2^{17}$ radical, a —$SR^{17}$ radical, a —$OR^{17}$ radical, a —$OSiR_3^{17}$ radical, or a —$PR_2^{17}$ radical, wherein: $R^{17}$ is one of a halogen atom, a $C_1$-$C_{10}$ alkyl group, or a $C_6$-$C_{10}$ aryl group;

$R^3$ as defined for $R^1$;

$R^8$ is wherein: $R^{14}$, $R^{15}$ and $R^{16}$ are identical and are a $C_1$-$C_4$ alkyl group;

$M^2$ is carbon;

$R^9$ and $R^{10}$ are identical or different, and have the meanings stated for $R^1$;

$R^4$, $R^5$, $R^6$ and $R^7$ are identical or different, and have the meanings stated for $R^1$ provided that at least one of $R^4$ and $R^7$ is not hydrogen; and m and n are identical or different, and are zero, 1 or 2;

wherein the propylene copolymer comprises:
   a) at least 50 wt % units derived from propylene;
   b) a ratio of g's as determined by the formula:

$$\frac{g'_{88-98}}{g'_{20-60}} \geq 1.10$$

where the subscripts, 88-98 and 20-60, refer to the wt % of copolymer eluted in GPC-DRI, and in the numerator and the denominator, g' is the weight average g' over the elution range designated 88-98 and 20-60, respectively, and wherein the propylene copolymer has a weight average molecular weight of 20,000 to 1,000,000 g/mol and has from 5 wt % to 28 wt % of ethylene derived units comonomer.

10. A process for preparing a propylene copolymer, the process comprising:
   polymerizing propylene and a comonomer selected from $C_2$ and $C_4$-$C_{10}$ in the presence of the product of an activator and a metallocene compound represented by the formula:

wherein: M is hafnium $R^1$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{40}$ arylalkyl group, a $C_7$-$C_{40}$ alkylaryl group, a $C_8$-$C_{40}$ arylalkenyl group, a halogen atom, or a conjugated diene, said conjugated diene substituted with one or more hydrocarbyl, tri(hydrocarbyl)silyl or tri(hydrocarbyl)silylhydrocarbyl groups, and said diene having up to 30 atoms not counting hydrogen;

$R^2$ are hydrogen;

$R^3$ are as defined for $R^1$;

$R^8$ is wherein: $R^{14}$, $R^{15}$ and $R^{16}$ are identical or different, and are a hydrogen, a halogen, a $C_1$-$C_{20}$ branched or linear alkyl group, a $C_1$-$C_{20}$ fluoroalkyl, a silylalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

$M^2$ is carbon;

$R^9$ and $R^{10}$ are identical or different, and have the meanings stated for $R^1$;

$R^4$, $R^5$, $R^6$ and $R^7$ are identical or different, and have the meanings stated for $R^1$ provided that at least one of $R^4$ and $R^7$ is not hydrogen; and m is 1 or 2 and n is 1 or 2;

wherein the propylene copolymer comprises:

a) at least 50 wt % units derived from propylene;

b) from 5 wt % to 28 wt % the comonomer; and c) a ratio of g' as determined by the formula:

$$\frac{g'_{88-98}}{g'_{20-60}} \geq 1.10$$

where the subscripts, 88-98 and 20-60, refer to the wt % of copolymer eluted in GPC-DRI, and in the numerator and the denominator, g' is the weight average g' over the elution range designated 88-98 and 20-60, respectively, and wherein the propylene copolymer has a weight average molecular weight of 20,000 to 1,000,000 g/mol.

11. The process of claim 10 wherein $R^3$ are hydrogen.

12. The process of claim 10 wherein $R^{14}$, $R^{15}$ and $R^{16}$, are hydrogen or a $C_1$-$C_4$ alkyl group.

13. The process of claim 10 wherein m is 1 and n is 1.

14. The process of claim 10 wherein $R^5$ and $R^6$ are hydrogen, $R^9$ and $R^{10}$, are hydrogen, and $R^4$ and $R^7$ are identical, and are one of a fluorine, a chlorine, a bromine, a $C_1$-$C_4$ alkyl group, or a $C_6$-$C_{10}$ aryl group.

15. The process of claim 10 wherein the polymer contains at least 75 weight percent propylene derived units, based on the total weight of the copolymer.

16. The process of claim 10 wherein the metallocene compound is a single species.

17. The process of claim 10 wherein the process is a single step polymerization process conducted in a single reactor.

18. A process for preparing a propylene copolymer, the process comprising:

polymerizing propylene and a comonomer selected from $C_2$ and $C_4$-$C_{10}$ in the presence of the product of an activator and a metallocene compound represented by the formula:

wherein: M is hafnium $R^1$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{40}$ arylalkyl group, a $C_7$-$C_{40}$ alkylaryl group, a $C_8$-$C_{40}$ arylalkenyl group, a halogen atom, or a conjugated diene, said conjugated diene substituted with one or more hydrocarbyl, tri(hydrocarbyl)silyl or tri(hydrocarbyl)silylhydrocarbyl groups, and said diene having up to 30 atoms not counting hydrogen;

$R^2$ is a hydrogen atom;
$R^3$ is a hydrogen atom;
$R^8$ is wherein: $R^{14}$, $R^{15}$ and $R^{16}$ are identical or different, and are a hydrogen, a halogen, a $C_1$-$C_{20}$ branched or linear alkyl group, a $C_1$-$C_{20}$ fluoroalkyl, a silylalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

$M^2$ is carbon;

$R^9$ and $R^{10}$ are identical or different, and have the meanings stated for $R^1$;

$R^4$, $R^5$, $R^6$ and $R^7$ are identical or different, and have the meanings stated for $R^1$ provided that at least one of $R^4$ and $R^7$ is not hydrogen;

m is 1 or 2;

n is 1 or 2; and wherein the propylene copolymer comprises:

a) at least 50 wt % units derived from propylene;
b) from 5 wt % to 28 wt % of the comonomer; and
c) a ratio of g' as determined by the formula:

$$\frac{g'_{88-98}}{g'_{20-60}} \geq 1.10$$

where the subscripts, 88-98 and 20-60, refer to the wt % of copolymer eluted in GPC-DRI, and in the numerator and the denominator, g' is the weight average g' over the elution range designated 88-98 and 20-60, respectively, and d) a weight average molecular weight of 20,000 to 1,000,000 g/mol.

19. The process of claim 18 wherein $R^{14}$, $R^{15}$ and $R^{16}$, are hydrogen or a $C_1$-$C_4$ alkyl group.

20. The process of claim 18 wherein m is 1 and n is 1.

21. The process of claim 18 wherein the polymer contains at least 75 weight percent propylene derived units, based on the total weight of the copolymer.

22. The process of claim 18 wherein the metallocene compound is a single species.

23. The process of claim 18 wherein the process is a single step polymerization process conducted in a single reactor.

24. The process of claim 18 wherein the ratio of g' is equal to or greater than 1.20.

25. The process of claim 18 wherein the ratio of g' is equal to or greater than 1.30.

26. A process for preparing a propylene copolymer, the process comprising:

polymerizing propylene and a comonomer selected from $C_2$ and $C_4$-$C_{10}$ in the presence of the product of an activator and a metallocene compound represented by the formula:

wherein: M is hafnium $R^1$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{40}$ arylalkyl group, a $C_7$-$C_{40}$ alkylaryl group, a $C_8$-$C_{40}$ arylalkenyl group, a halogen atom, or a conjugated diene, said conjugated diene substituted with one or more hydrocarbyl, tri(hydrocarbyl)silyl or tri(hydrocarbyl)silylhydrocarbyl groups, and said diene having up to 30 atoms not counting hydrogen;

$R^2$ are identical or different, and are a hydrogen atom, a halogen atom, a $C_1$-$C_{10}$ alkyl group, a halogenated $C_1$-$C_{10}$ alkyl group, a $C_6$-$C_{10}$ aryl group, a halogenated $C_6$-$C_{10}$ aryl group, a $C_2$-$C_{10}$ alkenyl group, a $C_7$-$C_{40}$ arylalkyl group, a $C_8$-$C_{40}$ arylalkenyl group, a —$NR_2^{17}$ radical, a —$SR^{17}$ radical, a —$OR^{17}$ radical, a —$OSiR_3^{17}$ radical, or a —$PR_2^{17}$ radical, wherein: $R^{17}$ is one of a halogen atom, a $C_1$-$C_{10}$ alkyl group, or a $C_6$-$C_{10}$ aryl group;

$R^3$ as defined for $R^1$;

$R^8$ is wherein: $R^{14}$, $R^{15}$ and $R^{16}$ are identical or different, and are a hydrogen, a halogen, a $C_1$-$C_{20}$ branched or linear alkyl group, a $C_1$-$C_{20}$ fluoroalkyl, a silylalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

$M^2$ is carbon;

m is 1 or 2;

n is 1 or 2; and $R^5$ and $R^6$ are hydrogen, $R^9$ and $R^{10}$, are hydrogen, and $R^4$ and $R^7$ are identical, and are one of a fluorine, a chlorine, a bromine, a $C_1$-$C_4$ alkyl group, or a $C_6$-$C_{10}$ aryl group;

wherein the propylene copolymer comprises:
a) at least 50 wt % units derived from propylene;
b) from 5 wt % to 8 wt % of the comonomer; and
c) a ratio of g' as determined by the formula:

$$\frac{g'_{88-98}}{g'_{20-60}} \geq 1.10$$

where the subscripts, 88-98 and 20-60, refer to the wt % of copolymer eluted in GPC-DRI, and in the numerator and the denominator, g' is the weight average g' over the elution range designated 88-98 and 20-60, respectively, and wherein the propylene copolymer has a weight average molecular weight of 20,000 to 1,000,000 g/mol.

27. The process of claim 26 wherein $R^2$ are hydrogen.

28. The process of claim 26 wherein $R^2$ and $R^3$ are hydrogen.

29. The process of claim 26 wherein $R^{14}$, $R^{15}$ and $R^{16}$, are hydrogen or a $C_1$-$C_4$ alkyl group.

30. The process of claim 26 wherein m is 1 and n is 1.

31. The process of claim 26 wherein the polymer contains at least 75 weight percent propylene derived units, based on the total weight of the copolymer.

32. The process of claim 26 wherein the metallocene compound is a single species.

33. The process of claim 26 wherein the process is a single step polymerization process conducted in a single reactor.

34. A process for preparing a propylene copolymer composition comprising:
polymerizing propylene and a comonomer of ethylene in the presence of the product of an activator and a metallocene compound represented by the formula:

wherein: M is hafnium;
$R^1$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{10}$ arylalkyl group, a $C_7$-$C_{40}$ alkylaryl group, a $C_8$-$C_{40}$ arylalkenyl group, a halogen atom, or a conjugated diene, said conjugated diene substituted with one or more hydrocarbyl, tri(hydrocarbyl)silyl or tri(hydrocarbyl)silylhydrocarbyl groups, and said diene having up to 30 atoms not counting hydrogen;

$R^2$ are identical or different, and are a hydrogen atom, a halogen atom, a $C_1$-$C_{10}$ alkyl group, a halogenated $C_1$-$C_{10}$ alkyl group, a $C_6$-$C_{10}$ aryl group, a halogenated $C_6$-$C_{10}$ aryl group, a $C_2$-$C_{10}$ alkenyl group, a $C_7$-$C_{10}$ arylalkyl group, a $C_8$-$C_{40}$ arylalkenyl group, a —$NR_2^{17}$ radical, a —$SR^{17}$ radical, a —$OR^{17}$ radical, a —$OSiR_3^{17}$ radical, or a —$PR_2^{17}$ radical, wherein: $R^{17}$ is one of a halogen atom, a $C_1$-$C_{10}$ alkyl group, or a $C_6$-$C_{10}$ aryl group;

$R^3$ as defined for $R^1$;
$R^8$ is wherein: $R^{14}$, $R^{15}$ and $R^{16}$ are identical or different, and are a hydrogen, a halogen, a $C_1$-$C_{20}$ branched or linear alkyl group, a $C_1$-$C_{20}$ fluoroalkyl, a silylalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

$M^2$ is carbon;
$R^5$ and $R^6$ are hydrogen;
$R^9$ and $R^{10}$, are hydrogen;
$R^4$ and $R^7$ are identical and are a fluorine, a chlorine a bromine, a $C_1$-$C_4$ alkyl group, or a $C_6$-$C_{10}$ aryl group;
m is 1 or 2; and
n is 1 or 2;
wherein the propylene copolymer comprises:
a) at least 50 wt % units derived from propylene;
b) from 5 wt % to 8 wt % units derived from ethylene; and
c) a ratio of g' as determined by the formula:

$$\frac{g'_{88-98}}{g'_{20-60}} \geq 1.10$$

where the subscripts, 88-98 and 20-60, refer to the wt % of copolymer eluted in GPC-DRI, and in the numerator and the denominator, g' is the weight average g' over the elution range designated 88-98 and 20-60, respectively, and wherein the propylene copolymer has a weight average molecular weight of 20,000 to 1,000,000 g/mol.

35. The process of claim 34 wherein $R^2$ are identical or different $C_1$-$C_4$ alkyl groups.

36. The process of claim 34 wherein $R^2$ are identical $C_1$-$C_4$ alkyl groups, and wherein $R^3$ are hydrogen.

37. The process of claim 34 wherein $R^{14}$, $R^{15}$ and $R^{16}$, are identical and are a $C_1$-$C_4$ alkyl group.

38. The process of claim 34 wherein m is 1 and n is 1.

39. The process of claim 34 wherein the composition contains at least 75 weight percent propylene derived units based on the total weight of the composition.

40. The process of claim 34 wherein the metallocene compound is a single species.

41. The process of claim 34 wherein the process is a single step polymerization process conducted in a single reactor.

* * * * *